United States Patent

Lantagne et al.

Patent Number: 5,298,906
Date of Patent: Mar. 29, 1994

[54] ANTENNA ISOLATION FOR CONTINUOUS WAVE RADAR SYSTEMS

[75] Inventors: John A. Lantagne, Salem, N.H.; Edwin C. Powers, Groveland, Mass.

[73] Assignee: Raytheon Company, Lexington, Mass.

[21] Appl. No.: 40,795

[22] Filed: Mar. 31, 1993

[51] Int. Cl.$^5$ .................................................. G01S 7/03
[52] U.S. Cl. ............................................................ 342/175
[58] Field of Search ............................................... 342/175

[56] References Cited

U.S. PATENT DOCUMENTS

| | | | |
|---|---|---|---|
| 2,441,615 | 5/1948 | Brown | 342/175 X |
| 3,120,640 | 2/1964 | Midlock et al. | 342/175 X |
| 4,200,870 | 4/1980 | Gabbitas | 342/175 |

Primary Examiner—T. H. Tubbesing
Attorney, Agent, or Firm—Richard M. Sharkansky

[57] ABSTRACT

A radio frequency energy radar system having a transmitting antenna system for transmitting and directing CW radio frequency energy toward a target. A receiving antenna system, adjacent to the transmitting antenna system, receives portions of the transmitted CW radio frequency energy reflected by the target. The receiving antenna system including a plurality of antenna elements disposed along a path and arranged to provide an antenna pattern having a main lobe antenna pattern directed toward the target and adjacent side lobe antenna pattern. A septum is positioned between the transmitting antenna and the receiving antenna, for shielding unwanted portions of the transmitted CW radio frequency energy from passing directly from the transmitting antenna to the antenna elements of the receiving antenna. The shielding means terminates along an edge positioned in a region forward of the antenna elements. The distances between the antenna elements and points along the edge are selected to produce a non-uniform phase distribution of unwanted CW energy scattered by the edge and received by the antenna elements, such phase distribution being selected to enable the receiving antenna system to focus such unwanted scattered energy into the side lobe antenna pattern, thereby decreasing the amount of coupled energy from the transmit array to the receive array.

8 Claims, 3 Drawing Sheets

ANTENNA ISOLATION FOR CONTINUOUS WAVE RADAR SYSTEMS

BACKGROUND OF THE INVENTION

This invention relates generally to continuous wave (CW) radar systems and more particularly to the isolation between transmit and receive antennas used in such systems.

As is known in the art, continuous wave radar systems have a wide variety of applications. In one such system, the transmitting antenna and the receiving antenna are mounted adjacent one another on a common platform. Both the transmitting antenna and the receiving antenna have a plurality of horizontal rows of dipole antenna elements. The antenna elements of each row are coupled, in-phase, to a common feed port through a corporate feed network. Thus, each row of antenna elements produces an antenna pattern having a narrow main lobe, at the center of the row, directed into free space perpendicular to the row. A phase shifting network connects the feed ports of the transmitting antenna to the transmitter, and a phase shifting network connects the feed ports of the receiving antenna to the receiver. The relative phase shifts in the phase shifting networks enables the transmitting antenna and the receiving antenna to point their main lobe antenna patterns at the same desired elevation angle. Thus, the rotation of the transmitting and receiving antennas together as a unit about a vertical axis provides an azimuthal scan. Sequentially changing the relative phase shift provided by the phase shifting networks provides an elevation scan. During the scan, radio frequency energy is transmitted by the transmitting antenna and directed into free space. If the transmitted energy encounters a radar energy reflecting target, a portion of the reflected energy is received by the receiving antenna. The detection of such received energy indicates the presence, or acquisition of, a potential target. It is noted that during operation, the radar transmitter and receiver are on simultaneously for a continuous wave radar system.

For proper operation, it is highly desirable to prevent, or at least reduce to a minimum, the amount of transmitted energy passing directly from the transmitting antenna to the receiving antenna. Excessive power causes an increase in receiver noise above thermal noise and may require additional attenuation in the receiver, limiting the radar's receiver dynamic range. One technique used to provide this isolation is to insert a shield, or septum, between the two antennas. The septum is a planar conductive sheet, positioned in the horizontal plane between the transmitting and receiving antenna elements. Thus, if the sheet were of long enough, transmitted energy would be prevented from passing directly to the receiving antenna. However, as the length of the sheet is increased, the maximum elevation angle is correspondingly reduced. Thus, the system uses a shield of having a length limited by the maximum required elevation angle.

SUMMARY OF THE INVENTION

In accordance with the present invention a radio frequency energy radar system adapted to transmit and receive continuous wave (CW) radio frequency energy is provided. The radar system includes a transmitting antenna system, coupled to a source of the CW radio frequency energy, for transmitting and directing CW radio frequency energy towards a target. A receiving antenna system is positioned next to the transmitting antenna system. The receiving antenna system receives portions of the transmitted CW radio frequency energy reflected by the target. The receiving antenna system includes a plurality of antenna elements disposed along a path and arranged to provide an antenna pattern having a main lobe directed, toward the target, with adjacent sidelobes. A septum is positioned between the transmitting antenna and the receiving antenna. The septum shields unwanted portions of the transmitted CW radio frequency energy from passing directly from the transmitting antenna to the antenna elements of the receiving antenna. The shielding terminates along an edge positioned in a region forward of the antenna elements. The distances between the antenna elements in a row thereof and points along the edge differ from element to element to produce a non-uniform phase distribution for the unwanted CW energy scattered by the edge and received by the antenna elements. More particularly, the phase distribution is selected to enable the receiving antenna system to focus unwanted scattered energy into the side lobes of the receiving antenna.

With such arrangement, transmitted energy scattered by the edge of the shield and received by each row of antenna elements has a phase distribution which focuses the received energy into a lower gain side lobe of the receiving antenna. A shield used in the prior art having an edge parallel to the rows of antenna elements has been found to scatter the transmitted energy uniformly, or "in phase," across the rows of antenna elements. Such received energy additively combines, or focuses, into the high gain main lobe of the antenna pattern. On the other hand, the edge of the shield in the present invention scatters the energy with a non-uniform phase distribution across the antenna elements of each row to focus the scattered energy into a sidelobe which has significantly less gain then the main lobe. Thus, although the total amount of scattered energy received by the row of receiving antenna elements has been increased, because of the reduction in the surface area of the septum, the scattered energy appears in a sidelobe of the receiving antenna which has significantly lower gain then the gain of the main lobe. The net effect is a reduction in unwanted scattered energy at the output of any receive row.

BRIEF DESCRIPTION OF THE DRAWINGS

For a more complete understanding of the concepts of the invention reference is now made to the following drawings, in which.

DESCRIPTION OF THE PREFERRED EMBODIMENTS

Figure 1:
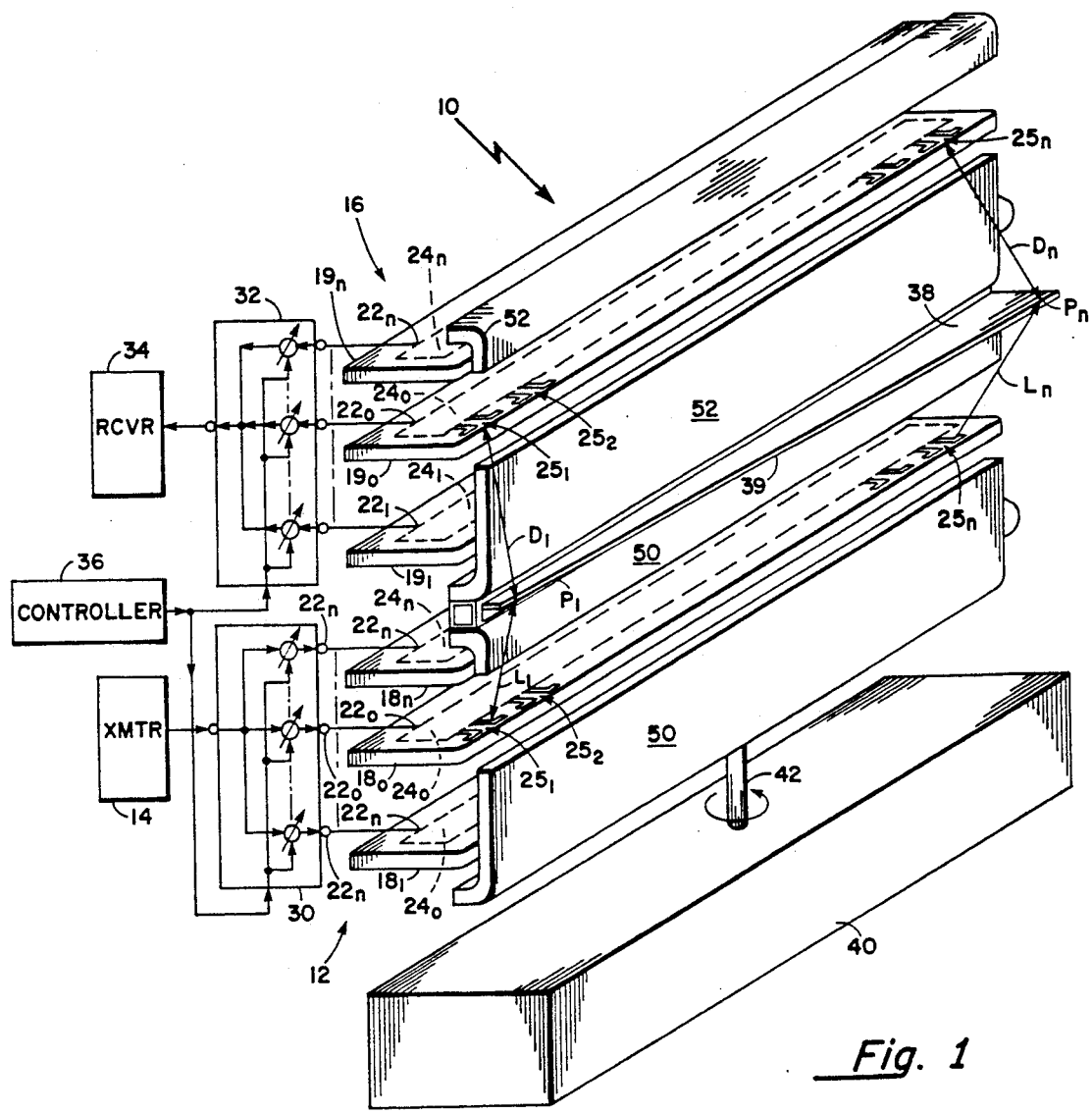
FIG. 1 is a diagrammatical sketch of a transmitting antenna and a receiving antenna used in radar system according to the invention; radomes used in such system being partially broken away to exposed rows of transmitting and receiving antenna elements used in the transmitting and receiving antennas, respectively.

Referring now to FIG. 1 a radio frequency energy radar system 10 is shown. The radar system 10 is adapted to transmit and receive continuous wave (CW) radio frequency energy. The radar system 10 includes a transmitting antenna system 12, coupled to a source, or transmitter 14 of the CW radio frequency energy, for transmitting and directing CW radio frequency energy produced by source toward a target (not shown). A receiving antenna system 16 is positioned next to, here above, the transmitting antenna system 12, for receiving portions of the transmitted CW radio frequency energy reflected by the target.

The transmitting antenna system 12 and the receiving antenna system 16 each include pluralities of rows $18_1$-$18_m$, $19_1$-$19_m$ of antenna elements $25_1$-$25_n$, respectively, as shown. Here, each one of the antenna elements $25_1$-$25_n$ are dipole antenna elements. The rows $18_1$-$18_m$, $19_1$-$19_m$ of antenna elements $25_1$-$25_n$, are identical in construction and an exemplary one of the rows $18_1$-$18_m$, $19_1$-$19_m$, here row $18_o$ is shown in detail in FIG. 2. The antenna elements $25_1$-$25_n$ are disposed along a path, here a linear, horizontal path 27. A corporate feed network $24_o$ is coupled between a feed port $22_o$ and the antenna elements $25_1$-$25_n$. The feed network $24_o$ is of conventional design and couples energy between the feed port $22_o$ and the plurality of antenna elements $25_1$-$25_n$ with a prescribed amplitude weighting and uniformly in phase. Thus, the feed network $24_o$ is arranged to provide an antenna pattern 26 having a main lobe 28 directed perpendicular to row $18_o$ of antenna elements $25_1$-$25_n$, and adjacent side lobes 29. More particularly, the feed network $24_o$ is arranged to provide a fixed, low sidelobe narrow azimuthal mainlobe 26 and a wide elevation main lobe antenna pattern (not shown).

A phase shifting network 30 (FIG. 1) connects the feed ports $22_1$-$22_n$ of the transmitting antenna system 12 to the transmitter 14. A phase shifting network 32 connects the feed ports $22_1$-$22_m$ of the receiving antenna system 16 to a receiver 34. The relative phase shifts provided by the phase shifting network 30 to the feed ports $22_1$-$22_m$ of the rows $18_1$-$18_m$ of transmitting antenna system 12 directs the main lobe at an elevation angular direction selected by a controller 36. Likewise, the relative phase shifts provided by the phase shifting network 32 to the feed ports $22_1$-$22_m$ of the receiving antenna system 16 directs the main lobe 28 (FIG. 2) in at elevation angular direction selected by the controller 36.

Figure 2:
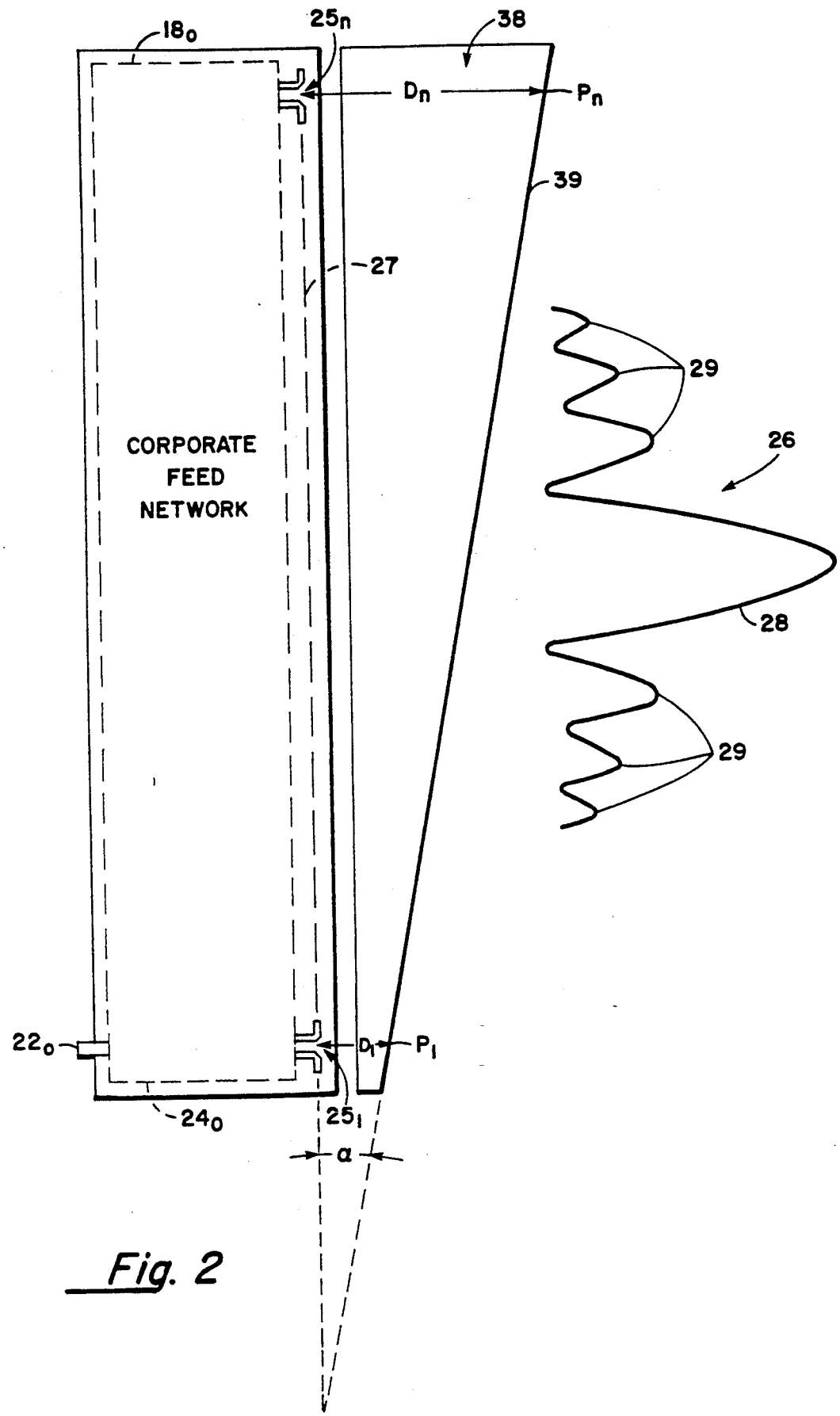
FIG. 2 is a plan view of one of the rows of antenna elements of FIG. 1 together with its associated corporate feed and the antenna pattern provided thereby, and a shield used to inhibit energy from passing between the transmitting antenna and the receiving antenna of FIG. 2.
Figure 3:
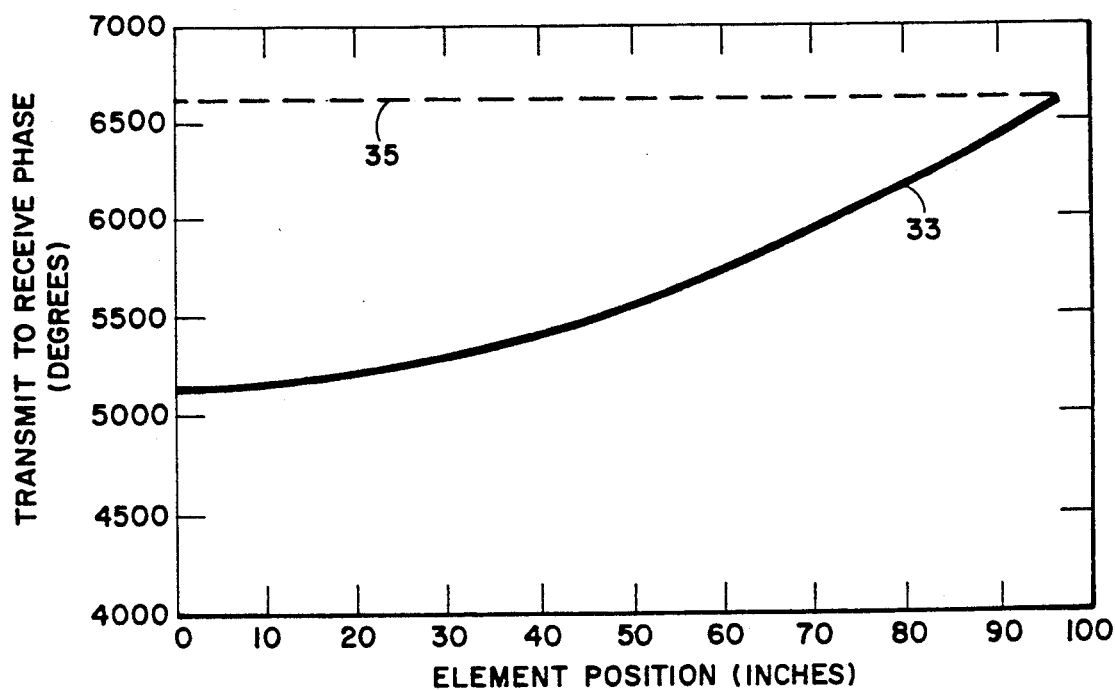
FIG. 3 is a pair of curves, one showing the relative phase shift of energy scattered by the shield used in the radar system of FIG. 1 as a function of the position of each of the antenna elements in a row thereof, and the other one showing the relative phase shift of energy scattered by a shield used in the prior art as a function of the position of each of the antenna elements in a row thereof.

A septum, or shield, 38 is positioned between the transmitting antenna 12 and the receiving antenna 16. The shield 38 inhibits unwanted portions of the transmitted CW radio frequency energy from passing directly from the transmitting antenna 12 to the antenna elements $25_1$-$25_n$ of the receiving antenna 16. The shield 38 terminates along an edge 39 positioned in free space forward of the rows $18_1$-$18_m$, and $19_1$-$19_m$. The edge 39 is along a straight line. The distances between the antenna elements $25_1$-$25_n$ in each of the plurality of rows $18_1$-$18_m$ of the transmitting system 12 and points along the edge 39 are different from antenna element to antenna element. Likewise, the distances between the antenna elements $25_1$-$25_n$ in each of the rows $19_1$ to $19_m$ and points along the edge 39 are different from antenna element to antenna element. For example, referring to FIGS. 1 and 2, and considering exemplary transmitting system 12 row $18_o$ and receiving 16 row $19_o$, the distances, $D_1$-$D_n$, between the antenna elements $25_1$-$25_n$ in row $19_o$, and points $P_1$-$P_n$, respectively, along the edge 39 are different. Likewise, the distances, $L_1$-$L_n$, between the antenna elements $25_1$-$25_n$ in row $18_o$, and points $P_1$-$P_n$, respectively, along the edge 39 are different, as shown in FIG. 2. The distances $D_1$-$D_n$, $L_1$-$L_n$ are selected to produce a non-uniform phase distribution across the row $19_o$ of receiving antenna elements 25, shown in FIG. 3 by curve 33. The phase distribution is selected to enable unwanted CW energy scattered by the edge 39 and received by the antenna elements 25 in the rows $19_o$ to focus into the side lobe antenna pattern 29 of the receiving antenna system 16. This arrangement "steers" the unwanted energy into sidelobes of the receiving antenna elements 25, taking full advantage of the low sidelobe feature of the rows $19_1$-$19_m$ of antenna elements 25 and their corporate feed networks $24_1$-$24_m$. It is noted that curve 35 of FIG. 3 shows that the path length from points along an edge according to the prior art (i.e., an edge parallel to the rows of antenna elements) is the same from receiving antenna element to receiving antenna element. Thus, a uniform phase distribution is produced. However, curve 33 shows that because the path length from points along an edge 39 (i.e., an edge which is at an acute angle, $\alpha$, with respect to the linear path 27 of the antenna elements 25 in rows $18_1$-$18_m$) is different from receiving antenna element to receiving antenna element, a non-uniform phase distribution is produced. Radomes 50, 52 are positioned vertically in front of the transmitting antenna system 12 and the receiving antenna system 16, respectively, as shown.

More particularly, the transmitting antenna system 12 and the receiving antenna system 16 are mounted adjacent one another, here one on top of the other, on a common platform 40. The platform 40 includes a motor, not shown, for rotating both systems 12, 16 together about vertical axis 42. Thus, the transmitting system 12 and receiving system 16 scan in azimuth as a unit during a target acquisition phase. As noted above, the controller 36 provides control signals to the phase shifting networks 30, 32 to provide elevation scans as the motor, not shown, provides the azimuthal scan. Here, the transmitting antenna system 12 is mounted vertically below the receiving antenna system 16.

Having described a preferred embodiment of the invention it will now be apparent to one of skill in the art that other embodiments incorporating its concepts may be used. For example, while the receiving antenna system has been shown mounted above the transmitting antenna system the opposite positioning may be used. Still further other types of antenna elements and feed networks may be used. It is felt, therefore, that this invention should not be restricted to the preferred embodiment but rather should be limited only by the spirit and scope of the appended claims.

What is claimed is:

1. A radio frequency energy radar system adapted to transmit and receive continuous wave (CW) radio frequency energy, comprising:

means, coupled to a source of the CW radio frequency energy, for transmitting and directing CW radio frequency energy produced by source toward a target;

means, spaced from the transmitting means, for receiving portions of the transmitted CW radio frequency energy reflected by the target, such receiving means including a plurality of antenna elements disposed along a path and arranged to provide an antenna pattern having a main lobe antenna pattern directed toward the target and adjacent side lobe antenna pattern; and means, disposed between the transmitting means and the receiving means, for shielding unwanted portions of the transmitted CW radio frequency energy from passing directly from the transmitting means to the antenna elements of the receiving means, such shielding means terminating along an edge position in a region forward of the antenna elements, the distances between the antenna elements and points along the edge differing from element to element.

2. The radar system recited in claim 1 wherein the receiving antenna means and the transmitting antenna means are mounted one vertically above the other and including means for rotating the receiving antenna means and the transmitting antenna means about a common vertical axis.

3. The radar system recited in claim 2 wherein the receiving means and the transmitting means each include a two dimensional array antenna comprising a plurality of rows of antenna elements, the antenna elements in each one of the rows thereof being disposed along a linear, horizontal path, the distances between the antenna elements of each one of the rows thereof and points along the edge of the shield differing from element to element.

4. A radio frequency energy radar system adapted to transmit and receive continuous wave (CW) radio frequency energy, comprising:

means, coupled to a source of the CW radio frequency energy, for transmitting and directing CW radio frequency energy produced by source toward a target;

means, spaced from the transmitting means, for receiving portions of the transmitted CW radio frequency energy reflected by the target, such receiving means including a plurality of antenna elements disposed along a path and arranged to provide an antenna pattern having a main lobe antenna pattern directed toward the target and adjacent side lobe antenna pattern; and means, disposed between the transmitting means and the receiving means, for shielding unwanted portions of the transmitted CW radio frequency energy from passing directly from the transmitting means to the antenna elements of the receiving means, such shielding means terminating along an edge position in a region forward of the antenna elements, the distances between the antenna elements and points along the edge being selected to produce a phase distribution of unwanted CW energy scattered by the edge and received by the antenna elements, such phase distribution being selected to enable the receiving means to focus such unwanted scattered energy into the side lobe antenna pattern.

5. A radio frequency energy radar system adapted to transmit and receive continuous wave (CW) radio frequency energy, comprising:

means, coupled to a source of radio frequency energy, for transmitting radio frequency energy from the source into free space, and for directing such transmitted energy toward a target in free space;

means, spaced from the transmitting means, for receiving energy desired portions of the transmitted energy reflected by the target, such receiving means including a plurality of antenna elements disposed along a path and arranged to form an antenna pattern having a main lobe and side lobes; and means, disposed between the transmitting means and the receiving means, for shielding unwanted portions of the transmitted energy from passing directly through free space from the transmitting means to the receiving means, such shielding means terminating along an edge disposed in a region forward of the antenna element, the distances between the antenna elements and points along the edge differing from element to element, unwanted energy scattered by the edge being received along the path of antenna elements with a phase distribution selected to focus such scattered energy into a side lobe pattern.

6. A radio frequency energy radar system adapted to transmit and receive continuous wave (CW) radio frequency energy, comprising:

means, coupled to a source of the CW radio frequency energy, for transmitting and angularly pointing the transmitted CW radio frequency energy produced by source in the direction of a target;

means, spaced from the transmitting means, for receiving portions of the transmitted CW radio frequency energy reflected by the target, such receiving means including a two dimensional array antenna comprising a plurality of rows of antenna elements, the antenna elements in each one of the rows thereof being disposed along a path, the antenna elements in each one of the rows thereof being arrange to provide an antenna pattern having a main lobe antenna pattern and an adjacent side lobe antenna pattern, the receiving means including means for angularly pointing the main lobe in the direction toward the target; and means, disposed between the transmitting means and the receiving means, for shielding unwanted portions of the transmitted CW radio frequency energy from passing directly from the transmitting means to the antenna elements of the receiving means, such shielding means having a shielding surface disposed to intersect terminating along an edge disposed in a region forward of the path of the antenna elements, the distances between the antenna elements and points along the edge differing from element to element.

7. A radio frequency energy radar system adapted to transmit and receive continuous wave (CW) radio frequency energy, comprising:

transmitting antenna means, coupled to a source of the CW radio frequency energy, for transmitting and angularly pointing the transmitted CW radio frequency energy produced by the source in the direction of a target;

receiving antenna means, for receiving portions of the transmitted CW radio frequency energy reflected by the target, such receiving antenna means including a two dimensional array antenna comprising a plurality of rows of antenna elements, the antenna elements in each one of the rows thereof being disposed along a linear, horizontal path, the antenna elements in each one of the rows thereof being arrange to provide an antenna pattern having a main lobe antenna pattern and an adjacent side lobe antenna pattern, the receiving means including means for angularly pointing the main lobe in the an elevation angular direction toward the target; and means, disposed between the transmitting means and the receiving means, for shielding unwanted portions of the transmitted CW radio frequency energy from passing directly from the transmitting means to the antenna elements of the receiving means, such shielding means having a shielding surface disposed to intersect terminating along an edge disposed in a region forward of the path of the antenna elements, the edge being at an angle with respect to the path of the antenna elements.

8. A radio frequency energy radar system adapted to transmit and receive continuous wave (CW) radio frequency energy, comprising:

means, coupled to a source of the CW radio frequency energy, for transmitting and directing CW radio frequency energy produced by source toward a target;

means, spaced from the transmitting means, for receiving portions of the transmitted CW radio frequency energy reflected by the target, such receiving means including a plurality of antenna elements disposed along a path and arranged to provide an antenna pattern having a main lobe antenna pattern directed toward the target and adjacent side lobe antenna pattern; and means, disposed between the transmitting means and the receiving means, for shielding unwanted portions of the transmitted CW radio frequency energy from passing directly from the transmitting means to the antenna elements of the receiving means, such shielding means terminating along an edge position in a region forward of the antenna elements, for producing a non-uniform phase distribution of unwanted CW energy scattered by the edge and received by the antenna elements.

* * * * *